United States Patent
Rothberg (10) Patent No.: US 7,872,822 B1
(45) Date of Patent: Jan. 18, 2011

(54) DISK DRIVE REFRESHING ZONES BASED ON SERPENTINE ACCESS OF DISK SURFACES

(75) Inventor: Michael S. Rothberg, Foothill Ranch, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 451 days.

(21) Appl. No.: 11/768,288

(22) Filed: Jun. 26, 2007

(51) Int. Cl.
*G11B 27/36* (2006.01)
*G11B 5/596* (2006.01)

(52) U.S. Cl. .................................. 360/31; 360/78.09

(58) Field of Classification Search ................. None
See application file for complete search history.

(56) References Cited

U.S. PATENT DOCUMENTS

| | | | |
|---|---|---|---|
| 4,642,715 A | 2/1987 | Ende | |
| 4,750,059 A | 6/1988 | Syracuse | |
| 4,949,036 A | 8/1990 | Bezinque et al. | |
| 5,202,799 A | 4/1993 | Hetzler et al. | |
| 5,446,718 A | 8/1995 | Shimizu et al. | |
| 5,487,077 A | 1/1996 | Hassner et al. | |
| 5,508,869 A | 4/1996 | Nanjyo | |
| 5,600,500 A | 2/1997 | Madsen et al. | |
| 5,651,131 A | 7/1997 | Chesley | |
| 5,682,273 A | 10/1997 | Hetzler | |
| 5,742,443 A | 4/1998 | Tsao et al. | |
| 5,768,044 A | 6/1998 | Hetzler et al. | |
| 5,784,296 A | 7/1998 | Baker et al. | |
| 5,812,755 A | 9/1998 | Kool et al. | |
| 5,854,778 A | 12/1998 | Shimizu et al. | |
| 5,870,237 A | 2/1999 | Emo et al. | |
| 5,872,800 A | 2/1999 | Glover et al. | |
| 5,873,114 A | 2/1999 | Rahman et al. | |
| 5,909,334 A | 6/1999 | Barr et al. | |
| 5,923,485 A | 7/1999 | Ito | |
| 5,930,358 A | 7/1999 | Rao | |
| 5,941,998 A | 8/1999 | Tillson | |
| 5,949,603 A | 9/1999 | Brown et al. | |
| 5,970,507 A | 10/1999 | Kato et al. | |
| 6,052,804 A | 4/2000 | Thowe et al. | |
| 6,091,559 A | 7/2000 | Emo et al. | |
| 6,105,104 A | 8/2000 | Guttmann et al. | |
| 6,130,796 A | 10/2000 | Wiselogel | |
| 6,172,839 B1 | 1/2001 | Ahn | |
| 6,181,500 B1 | 1/2001 | Serrano et al. | |
| 6,182,250 B1 | 1/2001 | Ng et al. | |
| 6,195,218 B1 | 2/2001 | Guttmann et al. | |
| 6,256,160 B1 | 7/2001 | Liikanen et al. | |

(Continued)

FOREIGN PATENT DOCUMENTS

JP    10-255202    9/1998

*Primary Examiner*—K. Wong (57) ABSTRACT

A disk drive is disclosed including a first disk surface comprising a plurality of data tracks, wherein each data track comprises a first plurality of data sectors, and a second disk surface comprising a plurality of data tracks, wherein each data track comprises a second plurality of data sectors. A first head is actuated over the first disk surface and a second head is actuated over the second disk surface. The first and second data sectors are accessed in a serpentine access pattern, wherein a plurality of refresh zones are defined relative to the serpentine access pattern. When a write command is received from a host, data is written to at least one of the refresh zones, and a refresh monitor associated with the refresh zone is updated.

19 Claims, 9 Drawing Sheets

U.S. PATENT DOCUMENTS

| | | |
|---|---|---|
| 6,266,199 B1 | 7/2001 | Gillis et al. |
| 6,289,484 B1 | 9/2001 | Rothberg et al. |
| 6,317,813 B1 | 11/2001 | Su et al. |
| 6,317,850 B1 | 11/2001 | Rothberg |
| 6,327,106 B1 | 12/2001 | Rothberg |
| 6,359,744 B1 | 3/2002 | Mallary |
| 6,384,999 B1 | 5/2002 | Schibilla |
| 6,393,511 B1 | 5/2002 | Albrecht et al. |
| 6,396,654 B2 | 5/2002 | Jeong et al. |
| 6,426,909 B1 | 7/2002 | Tomita |
| 6,429,984 B1 | 8/2002 | Alex |
| 6,441,981 B1 | 8/2002 | Cloke et al. |
| 6,442,715 B1 | 8/2002 | Wilson |
| 6,466,387 B1 | 10/2002 | Ogasawara et al. |
| 6,490,111 B1 | 12/2002 | Sacks |
| 6,493,176 B1 | 12/2002 | Deng et al. |
| 6,560,052 B2 | 5/2003 | Ng et al. |
| 6,570,801 B2 | 5/2003 | Yoshida et al. |
| 6,603,617 B1 | 8/2003 | Cross |
| 6,606,211 B1 | 8/2003 | Lim et al. |
| 6,628,466 B2 | 9/2003 | Alex |
| 6,650,492 B2 | 11/2003 | Lenny et al. |
| 6,661,597 B1 | 12/2003 | Codilian et al. |
| 6,691,255 B1 | 2/2004 | Rothberg et al. |
| 6,693,766 B1 | 2/2004 | Wilkes et al. |
| 6,697,203 B1 | 2/2004 | Cheng et al. |
| 6,697,992 B2 | 2/2004 | Ito et al. |
| 6,714,368 B1 | 3/2004 | Himle et al. |
| 6,747,827 B1 | 6/2004 | Bassett et al. |
| 6,763,430 B1 | 7/2004 | Camp |
| 6,781,780 B1 | 8/2004 | Codilian |
| 6,791,775 B2 | 9/2004 | Li et al. |
| 6,798,591 B2 | 9/2004 | Barnett et al. |
| 6,809,893 B2 | 10/2004 | Uzumaki et al. |
| 6,826,007 B1 | 11/2004 | Patton, III |
| 6,854,022 B1 | 2/2005 | Thelin |
| 6,854,071 B2 | 2/2005 | King et al. |
| 6,862,505 B2 | 3/2005 | Satoh et al. |
| 6,892,249 B1 | 5/2005 | Codilian et al. |
| 6,895,500 B1 | 5/2005 | Rothberg |
| 6,898,033 B2 | 5/2005 | Weinstein et al. |
| 6,947,234 B2 | 9/2005 | Lamberts et al. |
| 6,948,102 B2 | 9/2005 | Smith |
| 6,950,967 B1 | 9/2005 | Brunnett et al. |
| 6,980,386 B2 | 12/2005 | Wach et al. |
| 6,982,842 B2 | 1/2006 | Jing et al. |
| 6,987,630 B1 | 1/2006 | Higgins et al. |
| 6,993,678 B2 | 1/2006 | Cheok et al. |
| 6,995,933 B1 | 2/2006 | Codilian et al. |
| 7,006,321 B2 | 2/2006 | Kisaka |
| 7,024,614 B1 | 4/2006 | Thelin et al. |
| 7,032,127 B1 | 4/2006 | Egan et al. |
| 7,043,598 B2 | 5/2006 | Wu et al. |
| 7,057,839 B2 | 6/2006 | Shikuma et al. |
| 7,076,603 B1 | 7/2006 | Chheda |
| 7,120,737 B1 | 10/2006 | Thelin |
| 7,143,203 B1 | 11/2006 | Altmejd |
| 7,143,309 B2 | 11/2006 | Yoshida |
| 7,173,782 B2 | 2/2007 | Ikeda et al. |
| 7,177,979 B2 | 2/2007 | Kuwamura |
| 7,345,837 B1 | 3/2008 | Schreck et al. |
| 7,362,532 B2 | 4/2008 | Iwama |
| 7,436,610 B1 | 10/2008 | Thelin |
| 7,477,465 B2 | 1/2009 | Yu |
| 7,599,139 B1 | 10/2009 | Bombet et al. |
| 7,606,129 B2 | 10/2009 | Urata et al. |
| 2001/0036133 A1 | 11/2001 | Nagata et al. |
| 2001/0043424 A1 | 11/2001 | Nguyen |
| 2002/0039246 A1 | 4/2002 | Ding et al. |
| 2002/0141099 A1 | 10/2002 | Ng et al. |
| 2003/0007269 A1 | 1/2003 | Alex |
| 2003/0065872 A1 | 4/2003 | Edgar et al. |
| 2003/0221055 A1 | 11/2003 | Okada |
| 2004/0153949 A1 | 8/2004 | Ro et al. |
| 2004/0179292 A1 | 9/2004 | Zayas et al. |
| 2004/0252397 A1 | 12/2004 | Hodge et al. |
| 2004/0264028 A1 | 12/2004 | Ishii et al. |
| 2005/0063084 A1 | 3/2005 | Fujiwara et al. |
| 2006/0198041 A1 | 9/2006 | Kuwamura |
| 2007/0076315 A1 | 4/2007 | McMurtrey |
| 2007/0223124 A1 | 9/2007 | Amemiya |
| 2007/0277011 A1 | 11/2007 | Tanaka et al. |

DISK DRIVE REFRESHING ZONES BASED ON SERPENTINE ACCESS OF DISK SURFACES

CROSS REFERENCE TO RELATED PATENT APPLICATIONS

This application is related to commonly owned, co-pending U.S. patent application Ser. No. 11/255,436 entitled "DISK DRIVE EMPLOYING DIFFERENT ZONE BOUNDARIES ACROSS DISK SURFACES" the disclosure of which is incorporated herein by reference.

BACKGROUND

1. Field

The present invention relates to disk drives for computer systems. In particular, the present invention relates to a disk drive refreshing zones.

2. Description of the Related Art

Prior art disk drives employ one or more disks with heads actuated over the respective disk surfaces (e.g., top and bottom surfaces). Each disk surface comprises a plurality of radially spaced, concentric data tracks, wherein each data track comprises a number of data sectors for storing user data. During write operations, the disk drive receives user data and a logical block address (LBA) which is mapped to an absolute block address (ABA) identifying one of the data sectors for storing the user data. The LBA to ABA mapping enables defective data sectors to be mapped to spare data sectors.

Figure 1:
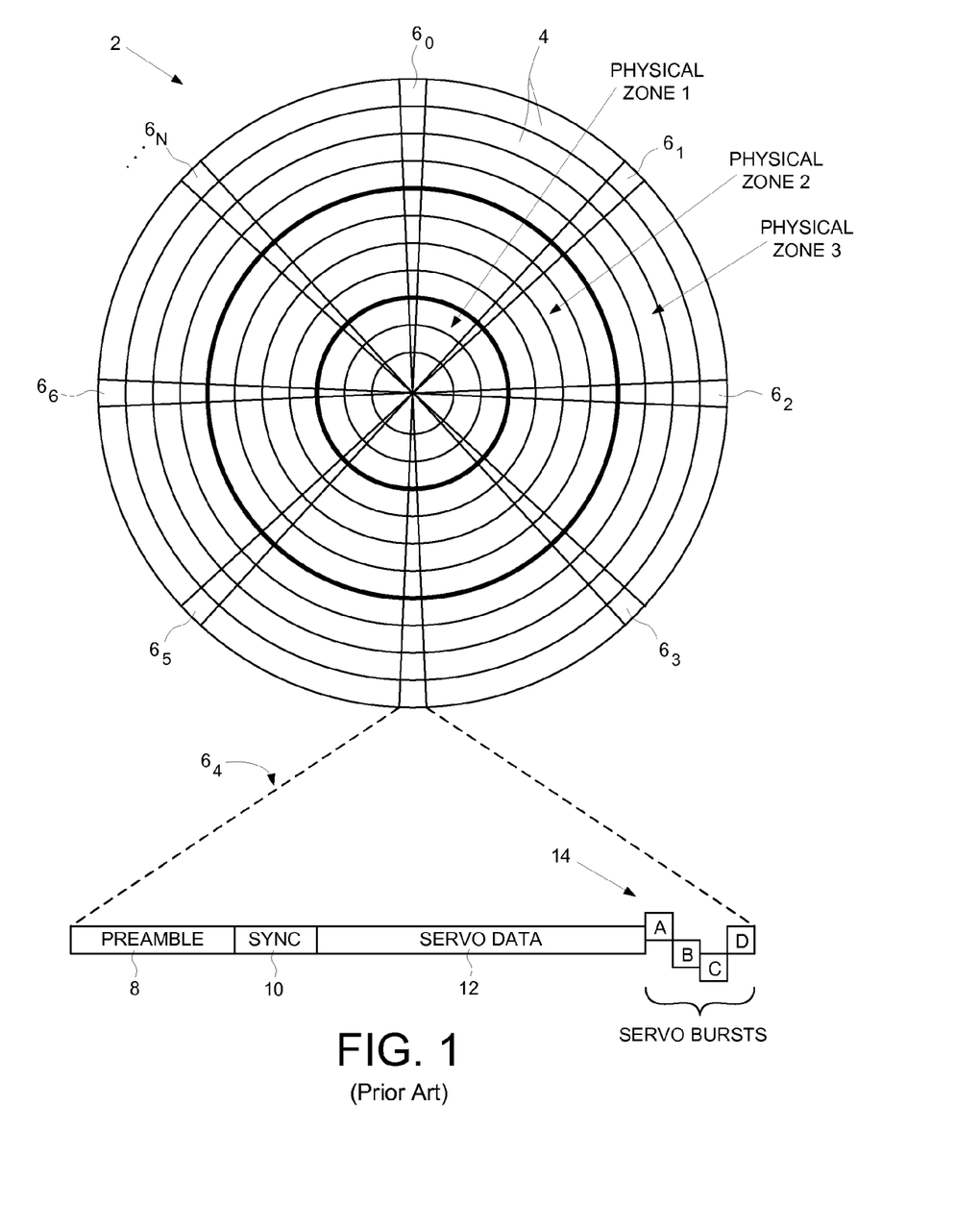
FIG. 1 shows a prior art disk format comprising a plurality of concentric data tracks banded together into a plurality of physical zones, wherein each data track comprises a plurality of data sectors and embedded servo sectors.

Because the disk is rotated at a constant angular velocity, the data rate is typically increased toward the outer diameter tracks (where the surface of the disk is spinning faster) in order to achieve a more constant linear bit density across the radius of the disk. To simplify design considerations, the data tracks are typically banded together into a number of physical zones, wherein the data rate is constant across a zone, and increased from the inner diameter zones to the outer diameter zones. This is illustrated in FIG. 1, which shows a prior art disk format 2 comprising a number of data tracks 4, wherein the data tracks are banded together in this example to form three physical zones from the inner diameter of the disk (ZONE 1) to the outer diameter of the disk (ZONE 3). The prior art disk format of FIG. 1 also comprises a number of embedded servo sectors $6_0$-$6_N$ recorded around the circumference of each data track. Each servo sector $6_i$ may comprise a preamble 8 for storing a periodic pattern, which allows proper gain adjustment and timing synchronization of the read signal, and a sync mark 10 for storing a special pattern used to symbol synchronize to a servo data field 12. The servo data field 12 may store coarse head positioning information, such as a track address, used to position the head over a target data track during a seek operation. Each servo sector $6_i$ may further comprise groups of servo bursts 14 (e.g., A, B, C and D bursts), which comprise a number of consecutive transitions recorded at precise intervals and offsets with respect to a data track centerline. The groups of servo bursts 14 provide fine head position information used for centerline tracking while accessing a data track during write/read operations.

During a write operation, a current is applied to a write element of the head (e.g., a write coil) to create a magnetic field which magnetizes the surface of the disk by orienting the direction of magnetic grains (e.g., horizontally in longitudinal magnetic recording, or vertically in perpendicular magnetic recording). The orientation of the grains exhibits hysteresis thereby generating their own magnetic field when the write magnetic field is removed. During a read operation, a read element of the head (e.g., a magnetoresistive element) transduces the magnetic field emanating from the disk surface into a read signal that is demodulated into an estimated data sequence.

The hysteresis of the magnetic grains is not permanent meaning that over time the grains will orientate into random directions (magnetic entropy) until the magnetic field is no longer sensed reliably (leading to data errors during reproduction). Magnetic entropy may also be precipitated by various factors, such as increasing ambient temperature. That is, at higher temperatures the uniform alignment of the grains will degrade faster. Another factor that precipitates magnetic entropy is a phenomenon referred to as adjacent track interference (ATI) wherein when writing data to a target track, the fringe field from the write element degrades the uniform alignment of the grains recorded in an adjacent track. The degrading effect of ATI on the adjacent tracks compounds over time with each write operation to the target track. Eventually, the magnetic field emanating from the disk surface will deteriorate to the point that the data is no longer recoverable.

To protect against catastrophic data loss due to magnetic entropy, the prior art has suggested to maintain refresh monitors for periodically refreshing data within refresh zones (reading and rewriting data) so as to periodically realign the magnetic orientation of the grains. The prior art has also suggested to bias the refresh monitors based on operating parameters. For example, as the number of write operations within a refresh zone increases, the refresh monitor is biased to trigger sooner so that the data is refreshed sooner. However, the prior art suggests to define the refresh zones in general terms, such as concentric regions on the disk.

There is, therefore, a need to improve the refresh monitor in a disk drive, and in particular, to define refresh zones in a manner that better accounts for ATI.

SUMMARY OF THE EMBODIMENTS OF THE INVENTION

An embodiment of the present invention comprises a disk drive including a first disk surface comprising a plurality of data tracks, wherein each data track comprises a first plurality of data sectors, and a second disk surface comprising a plurality of data tracks, wherein each data track comprises a second plurality of data sectors. A first head is actuated over the first disk surface and a second head is actuated over the second disk surface. The first and second data sectors are accessed in a serpentine access pattern, wherein a plurality of refresh zones are defined relative to the serpentine access pattern. When a write command is received from a host, data is written to at least one of the refresh zones, and a refresh monitor associated with the refresh zone is updated.

In one embodiment, at least one of the refresh zones extends across one of the disk surfaces, and in one embodiment, at least one of the refresh zones comprises a plurality of tracks on the disk surface. In another embodiment, at least one of the refresh zones extends across at least two disk surfaces.

In yet another embodiment, the serpentine access pattern defines a plurality of clusters, each cluster comprises a plurality of tracks, and a boundary of at least one of the refresh zones aligns with a boundary of one of the clusters. In one embodiment, at least one of the refresh zones comprises one or more of the clusters.

In still another embodiment, a plurality of write frequency counters are maintained for the refresh zones. The write frequency counter of a refresh zone is updated when performing a write operation to the refresh zone, and the refresh zones are adjusted in response to the write frequency counters. In one embodiment, the number of refresh zones is adjusted in response to the write frequency counters, and in another embodiment, a size of a refresh zone is adjusted in response to the write frequency counters.

In another embodiment, a plurality of absolute block addresses are maintained each assigned to one of the data sectors, wherein a logical block address associated with an access command is mapped to a corresponding absolute block address. A refresh operation is performed on a refresh zone by converting an absolute block address identifying the refresh zone into a logical block address of an access command and executing the access command.

Another embodiment of the present invention comprises a method of operating a disk drive, the disk drive including a first disk surface comprising a plurality of data tracks, wherein each data track comprises a first plurality of data sectors, and a second disk surface comprising a plurality of data tracks, wherein each data track comprises a second plurality of data sectors. A first head is actuated over the first disk surface and a second head is actuated over the second disk surface. The first and second data sectors are accessed in a serpentine access pattern, wherein a plurality of refresh zones are defined relative to the serpentine access pattern. When a write command is received from a host, data is written to at least one of the refresh zones, and a refresh monitor associated with the refresh zone is updated.

DETAILED DESCRIPTION OF EMBODIMENTS OF THE INVENTION

Figure 2A:
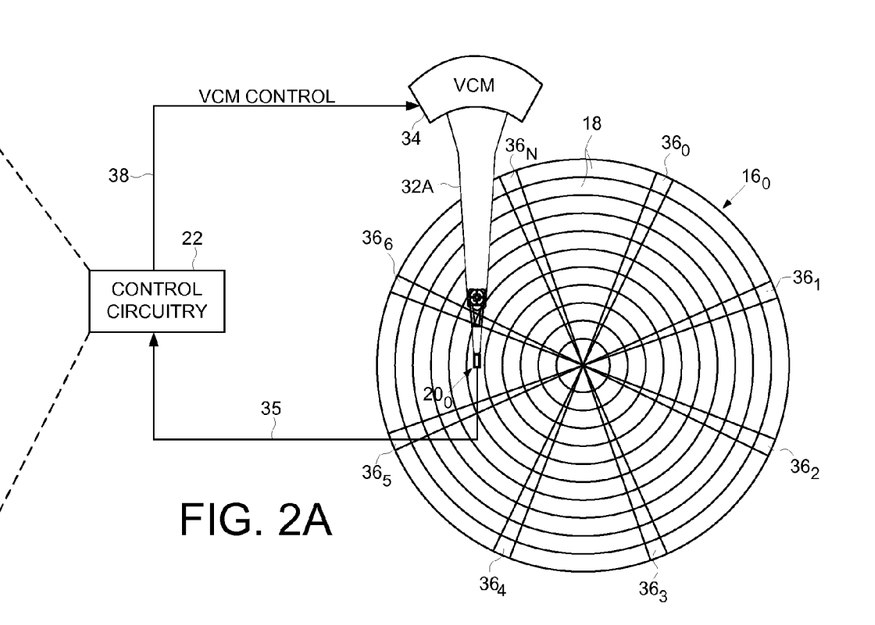
FIG. 2A shows a disk drive according to an embodiment of the present invention comprising a disk, a head actuated over the disk, and control circuitry for accessing the disk.
Figure 2B:
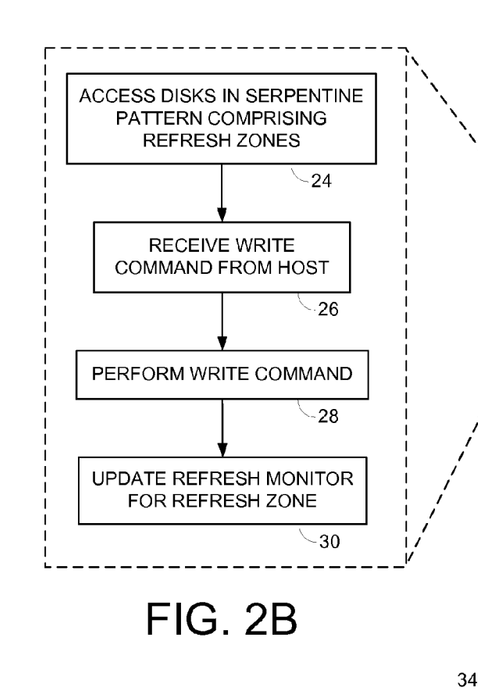
FIG. 2B is a flow diagram according to an embodiment of the present invention wherein a plurality of refresh zones are defined relative to a serpentine access pattern.
Figure 2C:
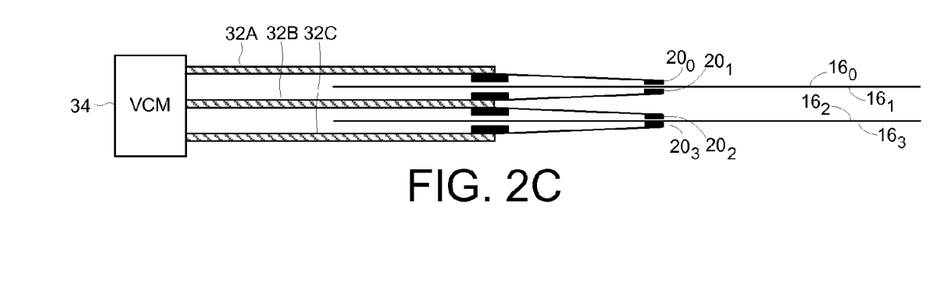
FIG. 2C shows a disk drive according to an embodiment of the present invention comprising two disks, four disk surfaces, and four corresponding heads.

FIGS. 2A and 2C show an exemplary disk drive according to an embodiment of the present invention including a first disk surface $16_0$ comprising a plurality of data tracks 18, wherein each data track comprises a first plurality of data sectors, and a second disk surface $16_1$ comprising a plurality of data tracks 18, wherein each data track comprises a second plurality of data sectors. A first head $20_0$ is actuated over the first disk surface $16_0$ and a second head $20_1$ is actuated over the second disk surface $16_1$. The disk drive further comprises control circuitry 22 for executing the flow diagram of FIG. 2B according to an embodiment of the present invention. At step 24 the first and second data sectors are accessed in a serpentine access pattern, wherein a plurality of refresh zones are defined relative to the serpentine access pattern. When a write command is received from a host at step 26, data is written to at least one of the refresh zones at step 28, and at step 30, a refresh monitor associated with the refresh zone is updated.

In the embodiment of FIG. 2A, each head $20_i$ is attached to a distal end of an actuator arm 32 which is rotated about a pivot by a voice coil motor (VCM) 34 in order to actuate the head $20_i$ radially over the disk $16_i$. The control circuitry 22 processes the read signal 35 emanating from the head 20, in order to demodulate the head position information recorded in embedded servo sectors $36_0$-$36_N$. After suitable compensation (e.g., filtering), the control circuitry 22 generates a control signal 38 applied to the VCM 34 in order to seek and maintain the head $20_i$ over a target data track during write and read operations.

Figure 3:
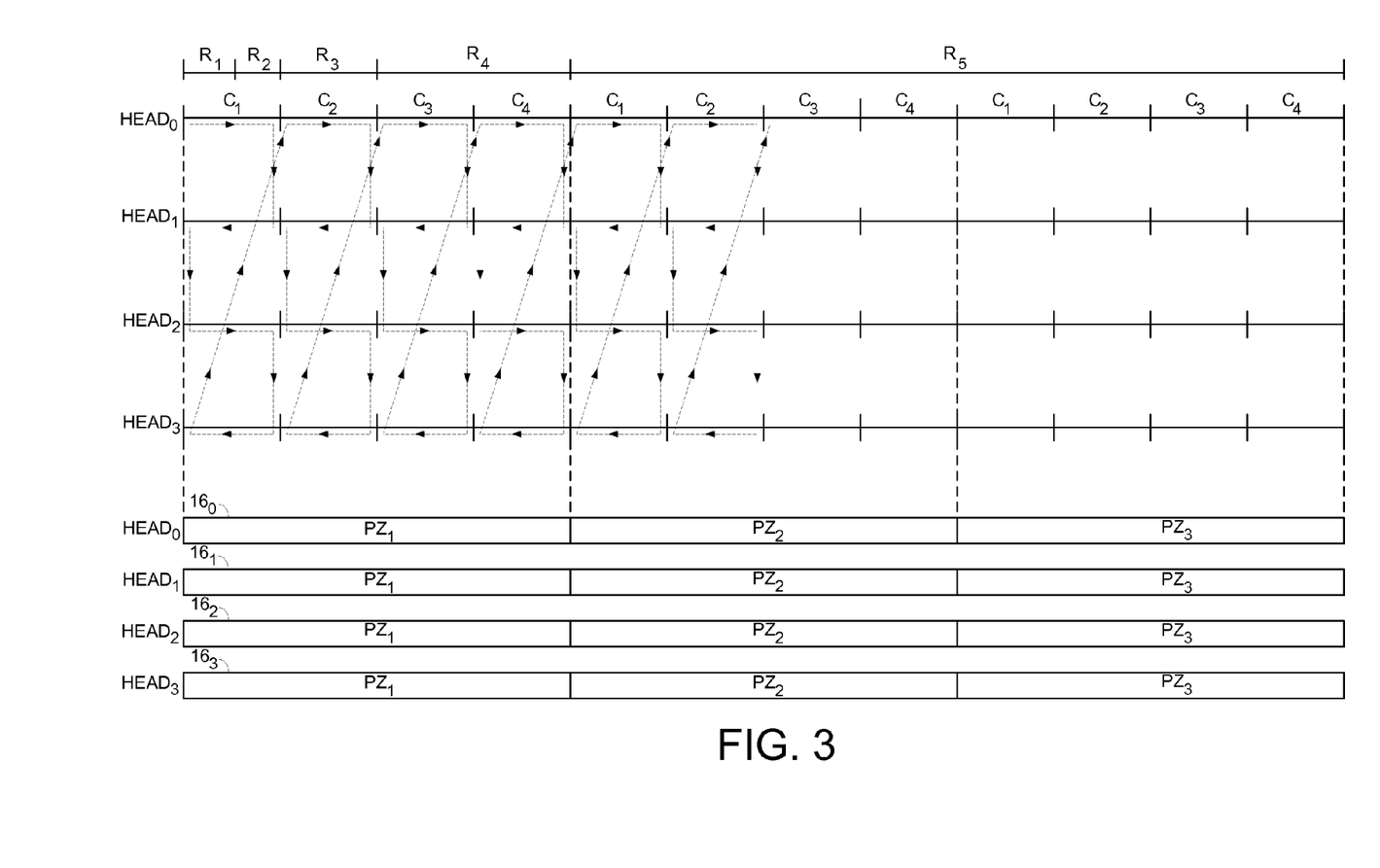
FIG. 3 shows a serpentine access pattern of the four disk surfaces according to an embodiment of the present invention.

Any suitable serpentine access pattern may be employed in the embodiments of the present invention, including cylinder serpentine and surface serpentine access patterns. In an embodiment shown in FIG. 3, each of the four disk surfaces $16_0$-$16_3$ of FIG. 2C is partitioned into a plurality of physical zones or PZs (three in the example shown), wherein the data rate may be increased from the inner diameter zones to the outer diameter zones. Each physical zone is partitioned into a number of clusters or Cs (four in the example shown), wherein each cluster comprises a plurality of tracks. An exemplary surface serpentine access pattern may follow the clusters as illustrated by the dashed, arrowed line. In one embodiment, the TPI of the data tracks is equal to or less than the TPI of the servo tracks to facilitate variable TPI recording. More details of this embodiment are disclosed in the above referenced co-pending U.S. patent application entitled "DISK DRIVE EMPLOYING DIFFERENT ZONE BOUNDARIES ACROSS DISK SURFACES".

In one embodiment, a refresh zone comprises one or more clusters, or a partial cluster, wherein at least one border of a refresh zone aligns with a border of a cluster. For example, in one embodiment each refresh zone may be defined as one cluster on one disk surface (e.g., $C_1$ on disk surface $16_0$), or a refresh zone may be defined as a plurality of clusters spanning multiple disk surfaces (e.g., $C_1$ on disk surfaces $16_0$-$16_3$). In the example embodiment shown in FIG. 3, refresh zones $R_1$ and $R_2$ each comprise one half of a cluster, refresh zone $R_3$ comprises one whole cluster, refresh zone $R_4$ comprises two clusters, and refresh zone $R_5$ comprises eight clusters spanning two physical zones.

Defining the zones relative to the serpentine access pattern and refreshing the zones accordingly may help compensate for the effect of adjacent track interference (ATI) since ATI is more likely to occur within the clusters (rather than across the cluster boundaries). In addition, defining the zones relative to the serpentine access pattern may increase the efficiency as well as reduce the complexity of the refresh operation for the same reason the clusters improve performance of the disk drive during normal operation.

Figure 4A:
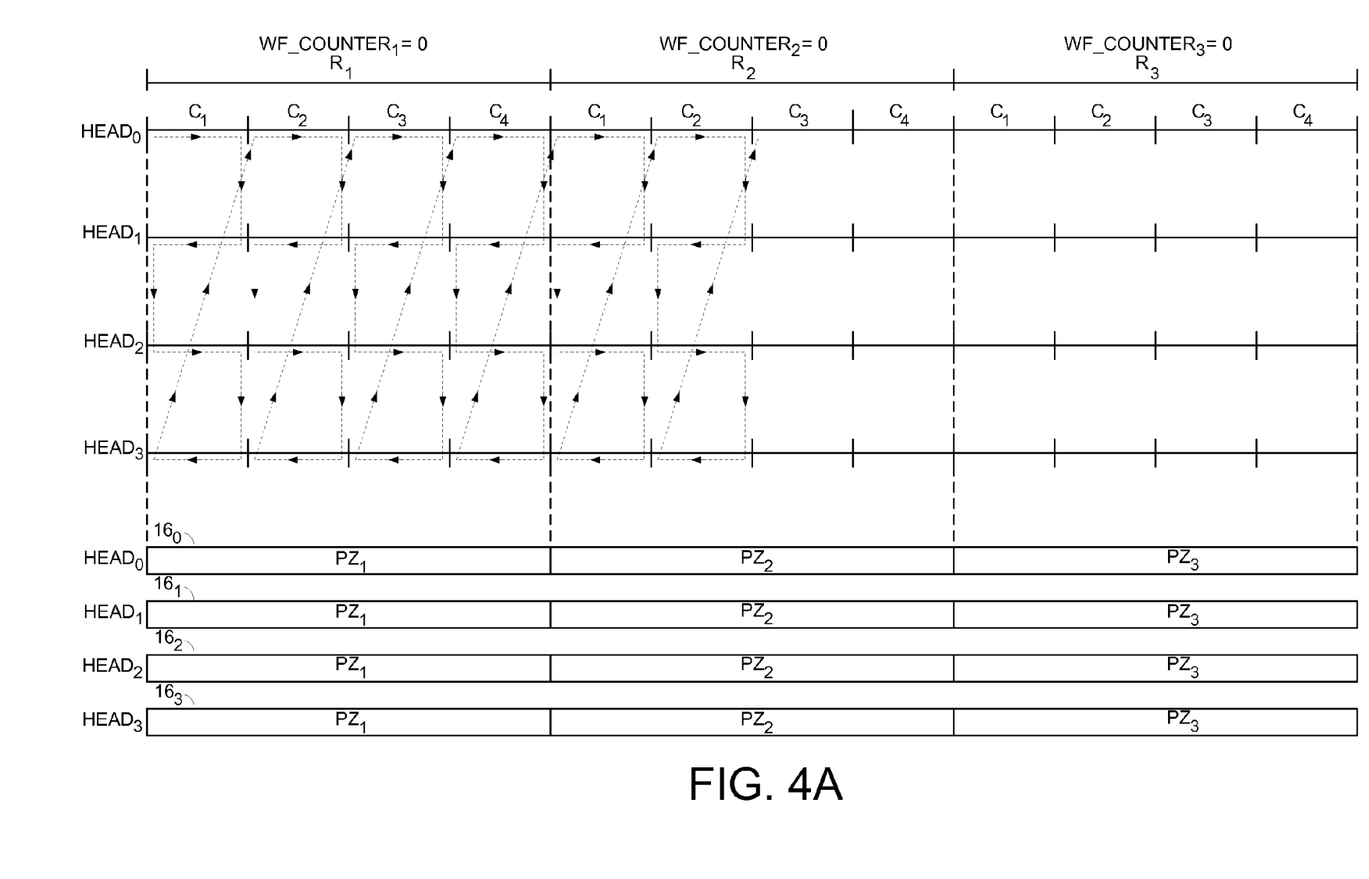
FIG. 4A shows an embodiment of the present invention wherein write frequency counters are maintained for the refresh zones.
Figure 4B:
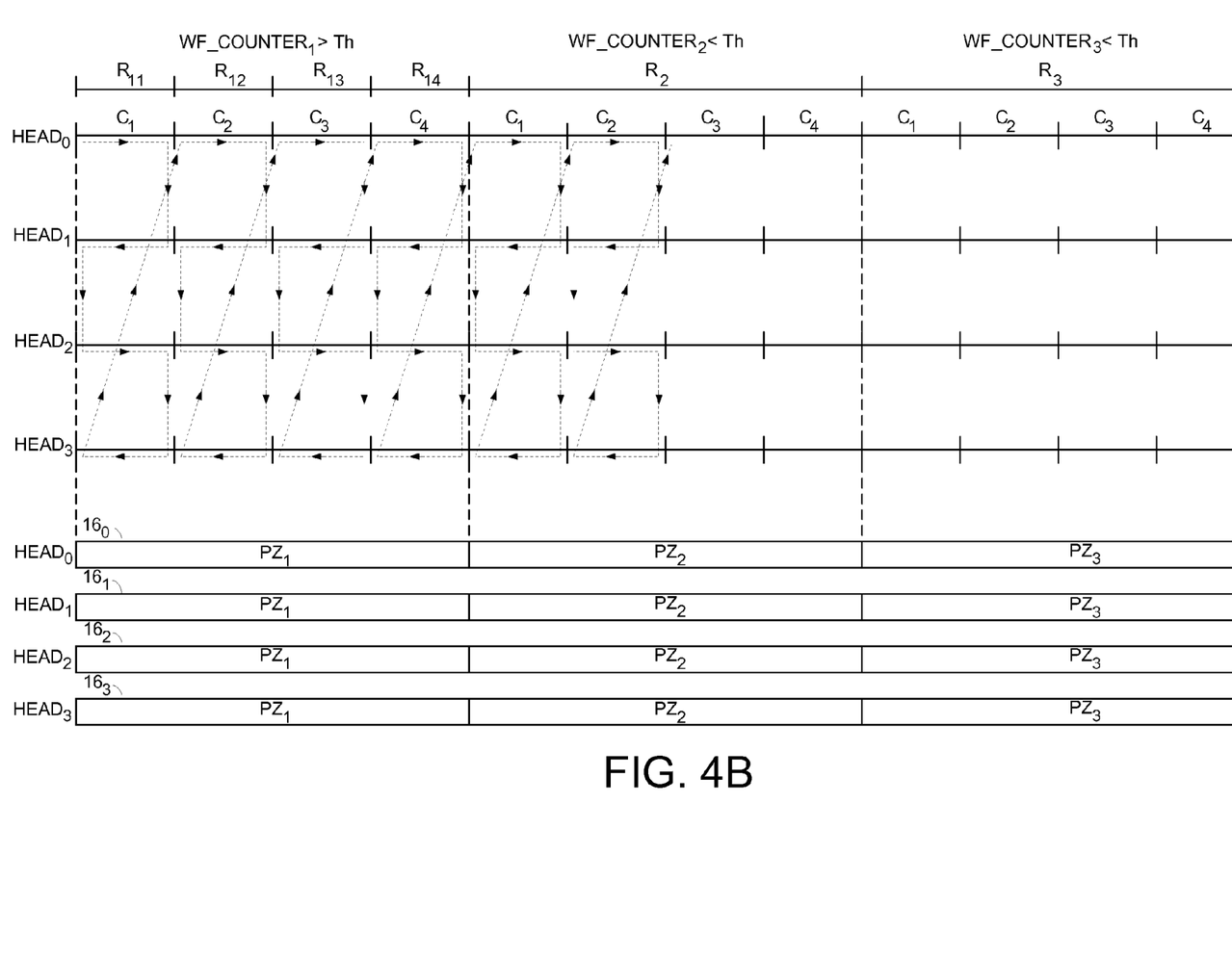
FIG. 4B shows an embodiment of the present invention wherein one of the refresh zones is divided into smaller refresh zones when the write frequency counter exceeds a threshold.

FIG. 4A shows an embodiment of the present invention wherein a plurality of write frequency (WF) counters are maintained for the refresh zones. The write frequency counter of a refresh zone is updated when performing a write operation to the refresh zone, and the refresh zones are adjusted in response to the write frequency counters. In one embodiment, the number of refresh zones is adjusted in response to the write frequency counters. For example, in an embodiment shown in FIG. 4B, three refresh zones ($R_1$-$R_3$) are defined initially each comprising four clusters. When the write frequency counter for refresh zone $R_1$ exceeds a threshold, the refresh zone $R_1$ may be subdivided into four smaller refresh zones $R_{11}$, $R_{12}$, $R_{13}$ and $R_{14}$ each monitored for a refresh operation using four separate refresh monitors, and each assigned a write frequency counter. When the write frequency counter for all four refresh zones $R_{11}$, $R_{12}$, $R_{13}$ and $R_{14}$ falls below a threshold, the four smaller refresh zones may be recombined back into the larger refresh zone $R_1$. Dynamically adjusting the number of refresh zones may improve performance by reducing the refresh frequency of zones having a low write frequency, as well as by reducing the amount of data refreshed in zones having a high write frequency.

Figure 4C:
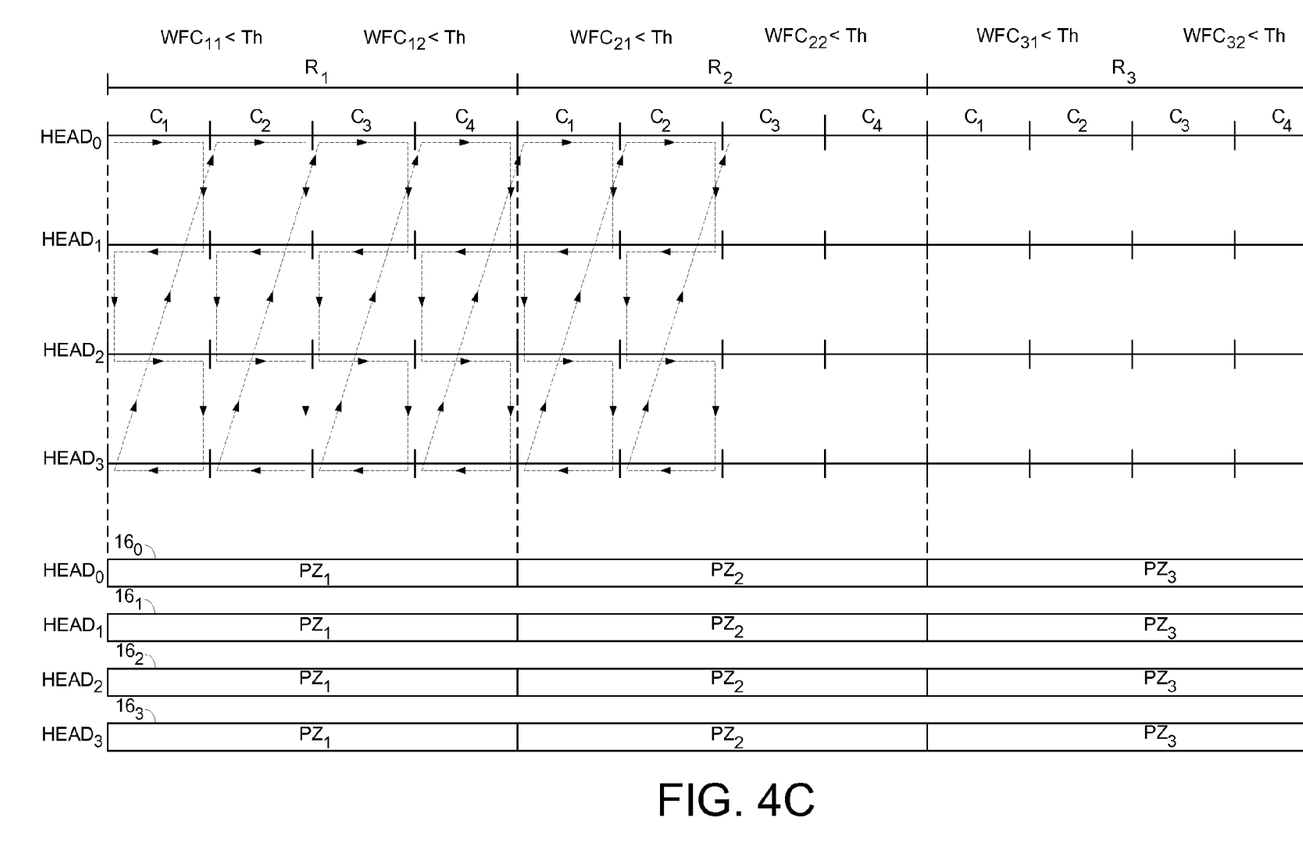
FIG. 4C shows an embodiment of the present invention wherein two write frequency counters are maintained for two sub-zones of a refresh zone.
Figure 4D:
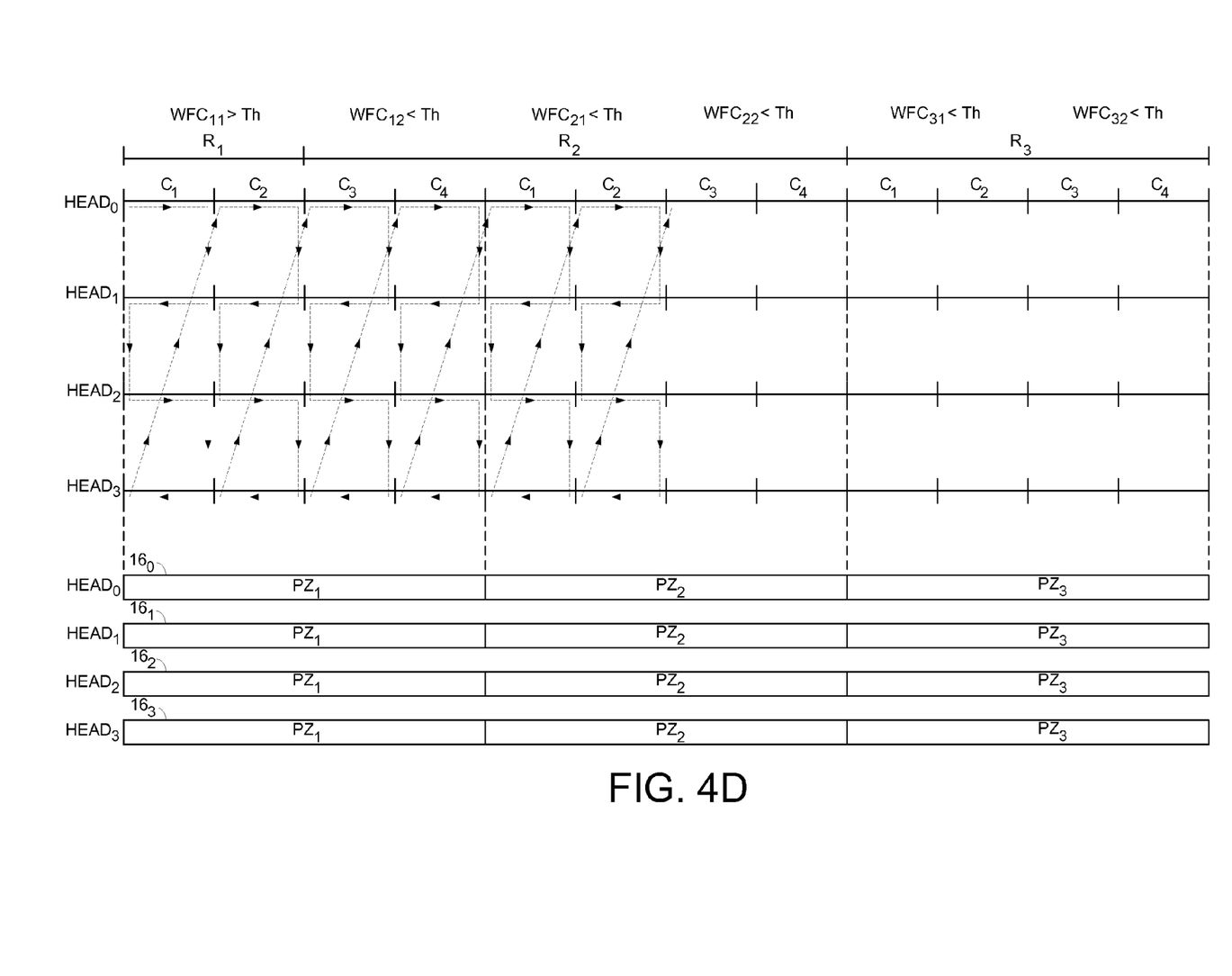
FIG. 4D shows an embodiment of the present invention wherein the zone boundaries are redefined when one of the sub-zone write frequency counters exceeds a threshold.

In another embodiment, a size of a refresh zone is adjusted in response to the write frequency counters. In an embodiment shown in FIG. 4C, each refresh zone ($R_1$-$R_3$) is assigned two subzone write frequency counters, wherein each subzone write frequency counter tracks the write frequency to one half of a refresh zone. Referring to FIG. 4D, when the subzone write frequency counter $WFC_{11}$ for the first half of refresh zone $R_1$ exceeds a threshold, the size of refresh zone $R_1$ is reduced by half, and the size of refresh zone $R_2$ is increased accordingly. If subsequently the write frequency counter $WFC_{11}$ falls below a threshold, the refresh zone $R_1$ may be expanded back to its original size. Similar to adjusting the number of refresh zones, dynamically adjusting the size of the refresh zones may improve performance by reducing the refresh frequency of zones having a low write frequency, as well as by reducing the amount of data refreshed in zones having a high write frequency.

Figure 5:
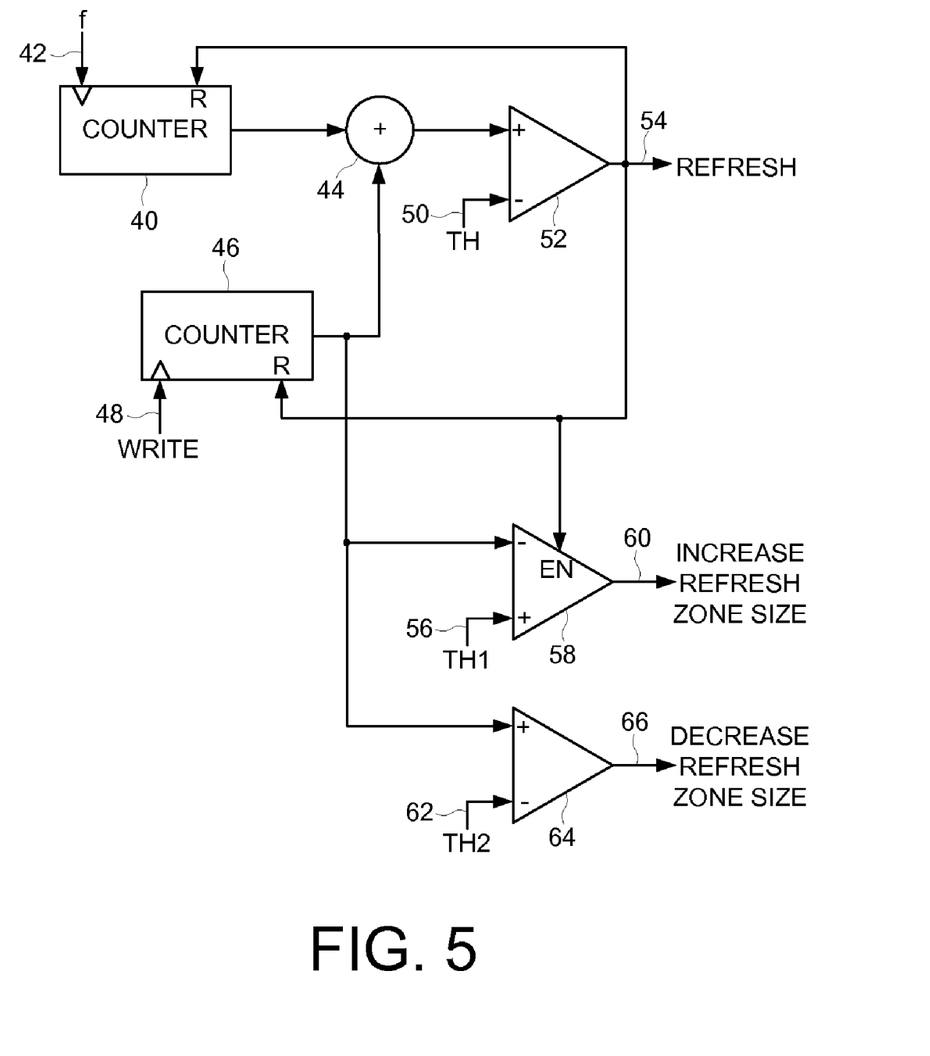
FIG. 5 shows a refresh monitor according to an embodiment of the present invention, including circuitry for implementing the write frequency counters.

FIG. 5 shows a refresh monitor that may be implemented by control circuitry 22 according to an embodiment of the present invention which also implements a write frequency counter for a particular refresh zone. In the embodiment shown in FIG. 5, an interval counter 40 is clocked at a frequency f 42 in order to track a refresh interval. The refresh interval (output of interval counter 40) is biased by adding 44 the output of a write counter 46 which tracks a number of writes to the corresponding refresh zone (clocked by a write signal 48). Biasing the refresh interval by the number of writes to the refresh zone helps compensate for the precipitating affect that ATI has on magnetic entropy. When the output of adder 44 exceeds a threshold 50 at comparator 52, a refresh signal 54 is activated so that the data stored in the refresh zone is refreshed. If at the end of the refresh interval the output of write counter 46 is less than a threshold 56 at comparator 58, a signal 60 is activated that may increase the size of the refresh zone. Conversely, if the output of the write counter 46 exceeds a threshold 62 at comparator 64 any time during the refresh interval, a signal 66 may be activated to decrease the size of the refresh zone. The refresh signal 54 may also enable the comparator 58 on the rising edge and reset the write counter 46 on the falling edge. In an alternate embodiment, instead of using refresh signal 54, the comparator 58 may be enabled by a separate timing signal over a fixed or adjustable interval.

In another embodiment, a plurality of absolute block addresses (ABAs) are maintained each assigned to one of the data sectors, wherein a logical block address (LBA) associated with an access command is mapped to a corresponding ABA. A refresh operation is performed on a refresh zone by converting an ABA identifying the refresh zone into a LBA of an access command and executing the access command.

Figure 6:
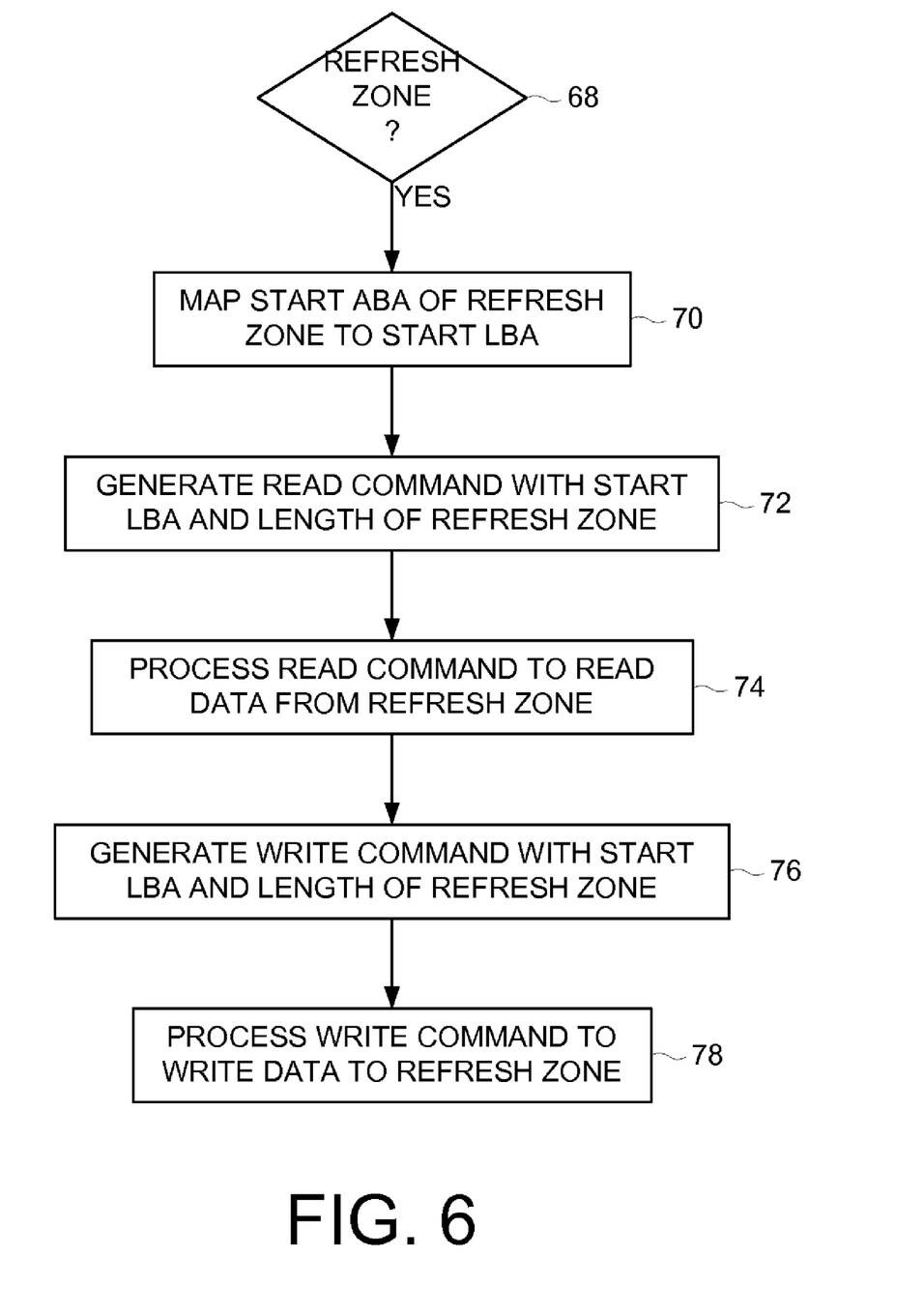
FIG. 6 is a flow diagram according to an embodiment of the present invention wherein a refresh operation is performed on a refresh zone by converting an absolute block address identifying the refresh zone into a logical block address of an access command and executing the access command.

A flow diagram shown in FIG. 6 illustrates this embodiment that may be implemented by control circuitry 22, wherein when at step 68, if a refresh zone needs to be refreshed, the starting ABA of the refresh zone is converted into a corresponding LBA at step 70. At step 72 a read command is generated with the start LBA and length of the refresh zone, and at step 74 the read command is processed by the disk drive (similar to a read command received from the host) in order to read the data from the refresh zone (and store the data in a volatile semiconductor memory). At step 76 a write command is generated with the start LBA and length of the refresh zone, and at step 78 the write command is processed by the disk drive (similar to a write command received from the host) in order to rewrite the data back to the refresh zone. Converting the starting ABA of a refresh zone into an LBA and length for processing as read/write commands simplifies the implementation of the refresh operation by sharing the same firmware already designed to process access commands received from the host. It may also improve performance by taking advantage of various disk format parameters, such as the track switching skew parameter.

The serpentine access pattern and refresh zones may be defined in any suitable manner in the embodiments of the present invention. For example, suitable data structures (e.g., tables) may be generated for the serpentine access pattern and stored in non-volatile memory, such as on the disk or in a semiconductor memory. Similar data structures may also be generated and stored that define the refresh zones, or in an alternative embodiment, the control circuitry 22 may process the data structures that define the serpentine access pattern in order to generate the data structures that define the refresh zones. As described above, in other embodiments the control circuitry 22 may also dynamically resize the refresh zones by making suitable modifications to the data structures that define the refresh zones.

Any suitable control circuitry 22 may be employed in the embodiments of the present invention, such as any suitable integrated circuit or circuits. For example, the control circuitry 22 may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry 22 comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry 22 comprises suitable logic circuitry, such as state machine circuitry.

What is claimed is:

1. A disk drive comprising:
a first disk surface comprising a plurality of data tracks, wherein each data track comprises a first plurality of data sectors;
a second disk surface comprising a plurality of data tracks, wherein each data track comprises a second plurality of data sectors;
a first head actuated over the first disk surface and a second head actuated over the second disk surface; and
control circuitry operable to:
access the first and second data sectors in a serpentine access pattern, wherein a plurality of refresh zones are defined relative to the serpentine access pattern;
receive a write command from a host; and
write data to at least one of the refresh zones, and update a refresh monitor associated with the refresh zone.

2. The disk drive as recited in claim 1, wherein at least one of the refresh zones extends across one of the disk surfaces.

3. The disk drive as recited in claim 2, wherein at least one of the refresh zones comprises a plurality of tracks on the disk surface.

4. The disk drive as recited in claim 1, wherein at least one of the refresh zones extends across at least two disk surfaces.

5. The disk drive as recited in claim 1, wherein:
the serpentine access pattern defines a plurality of clusters;
each cluster comprises a plurality of tracks; and
a boundary of at least one of the refresh zones aligns with a boundary of one of the clusters.

6. The disk drive as recited in claim 1, wherein the control circuitry is further operable to:
maintain a plurality of write frequency counters for the refresh zones;
update the write frequency counter of a refresh zone when performing a write operation to the refresh zone; and
adjust the refresh zones in response to the write frequency counters.

7. The disk drive as recited in claim 6, wherein the control circuitry is operable to adjust the number of refresh zones in response to the write frequency counters.

8. The disk drive as recited in claim 6, wherein the control circuitry is operable to adjust a size of a refresh zone in response to the write frequency counters.

9. The disk drive as recited in claim 1, wherein the control circuitry is further operable to:
maintain a plurality of absolute block addresses each assigned to one of the data sectors;
map a logical block address associated with an access command to a corresponding absolute block address; and
perform a refresh operation on a refresh zone by converting an absolute block address identifying the refresh zone into a logical block address of an access command and executing the access command.

10. A method of operating a disk drive, the disk drive comprising a first disk surface comprising a plurality of data tracks, wherein each data track comprises a first plurality of data sectors, a second disk surface comprising a plurality of data tracks, wherein each data track comprises a second plurality of data sectors, a first head actuated over the first disk surface and a second head actuated over the second disk surface, the method comprising:
accessing the first and second data sectors in a serpentine access pattern, wherein a plurality of refresh zones are defined relative to the serpentine access pattern;
receiving a write command from a host; and
writing data to at least one of the refresh zones, and updating a refresh monitor associated with the refresh zone.

11. The method as recited in claim 10, wherein at least one of the refresh zones extends across one of the disk surfaces.

12. The method as recited in claim 11, wherein at least one of the refresh zones comprises a plurality of tracks on the disk surface.

13. The method as recited in claim 10, wherein at least one of the refresh zones extends across at least two disk surfaces.

14. The method as recited in claim 10, wherein:
the serpentine access pattern defines a plurality of clusters;
each cluster comprises a plurality of tracks; and
a boundary of at least one of the refresh zones aligns with a boundary of one of the clusters.

15. The method as recited in claim 10, further comprising:
maintaining a plurality of write frequency counters for the refresh zones;
updating the write frequency counter of a refresh zone when performing a write operation to the refresh zone; and
adjusting the refresh zones in response to the write frequency counters.

16. The method as recited in claim 15, further comprising adjusting the number of refresh zones in response to the write frequency counters.

17. The method as recited in claim 15, further comprising adjusting a size of a refresh zone in response to the write frequency counters.

18. The method as recited in claim 10, further comprising:
maintaining a plurality of absolute block addresses each assigned to one of the data sectors;
mapping a logical block address associated with an access command to a corresponding absolute block address; and
performing a refresh operation on a refresh zone by converting an absolute block address identifying the refresh zone into a logical block address of an access command and executing the access command.

19. A disk drive comprising:
a first disk surface comprising a plurality of data tracks, wherein each data track comprises a first plurality of data sectors;
a second disk surface comprising a plurality of data tracks, wherein each data track comprises a second plurality of data sectors;
a first head actuated over the first disk surface and a second head actuated over the second disk surface;
a means for accessing the first and second data sectors in a serpentine access pattern, wherein a plurality of refresh zones are defined relative to the serpentine access pattern;
a means for receiving a write command from a host; and
a means for writing data to at least one of the refresh zones, and for updating a refresh monitor associated with the refresh zone.

* * * * *